(No Model.)
W. STANLEY, Jr. & J. F. KELLY.
ALTERNATING CURRENT MOTOR.
No. 505,859. Patented Oct. 3, 1893.
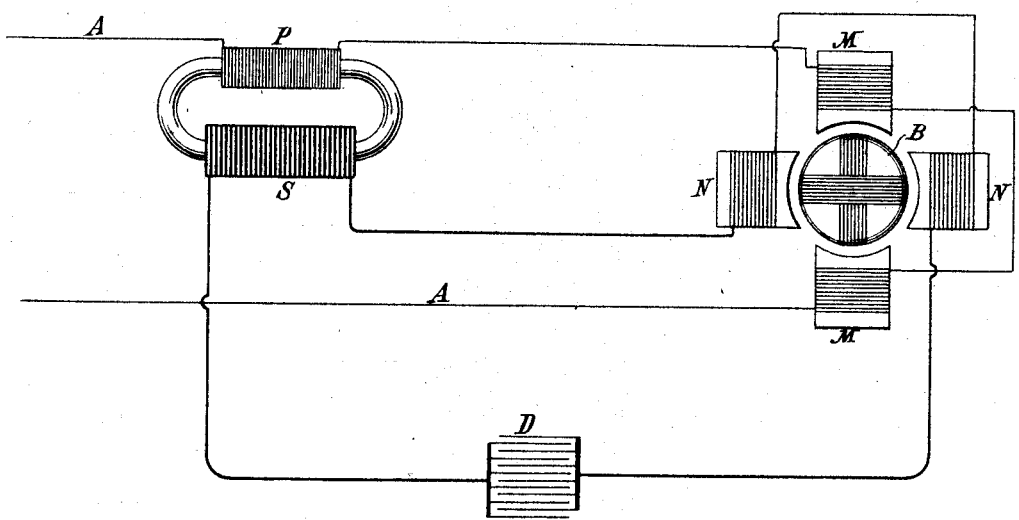
Witnesses
Raphael Netter
Robt. F. Gaylord
William Stanley Jr.
John F. Kelly
Inventors
By their Attorneys
Duncan & Page

UNITED STATES PATENT OFFICE.

WILLIAM STANLEY, JR., AND JOHN F. KELLY, OF PITTSFIELD, MASSACHUSETTS, ASSIGNORS TO THE STANLEY LABORATORY COMPANY, OF SAME PLACE.

ALTERNATING-CURRENT MOTOR.

SPECIFICATION forming part of Letters Patent No. 505,859, dated October 3, 1893.

Application filed June 8, 1892. Serial No. 435,982. (No model.)

*To all whom it may concern:*

Be it known that we, WILLIAM STANLEY, Jr., and JOHN F. KELLY, citizens of the United States, residing at Pittsfield, in the county of Berkshire and State of Massachusetts, have invented certain new and useful Improvements in Alternating-Current Motors, of which the following is a specification, reference being had to the drawings accompanying and forming a part of the same.

When an electro-magnetic motor, which requires for its operation alternating currents differing in phase, which are caused to flow through separate or independent energizing circuits, is run by currents derived from a single source, and the difference of phase obtained by inserting in one of the derived or branched energizing circuits a condenser, or what we have elsewhere described as a polarizer or polarization cell, a difficulty is met with due to the following conditions:

The condenser or polarizer is so adjusted with reference to the particular conditions of the circuit that the current in the circuit in which it is included may have a negative lag, or in other words, so that the phases of the current shall be ahead of the impressed electro-motive force, or the electro-motive force due to capacity shall exceed that due to self-induction, but this adjustment is made for the condition of full load, of the motor. At full load, however, the self-induction is largely neutralized by the reactive action of the motor armature, but since this effect is reduced as the load on the motor is lessened, the self-inductive and capacity effects become more nearly equal. The reduction of the reactive action of the armature, moreover, brings about a reduction of the effective resistance of the field circuit, and hence it follows that as the load is lessened the current in the branch circuit possessing negative lag, increases in amount and decreases in lag, thus causing a great waste of energy.

Instead of simply dividing a main or single circuit of alternating currents into the two-branch circuits for the field coils of a motor, and in parallel it has also been proposed to include the primary coil of a converter in circuit with one of the field or energizing coils of the motor, and connect its secondary through a condenser or polarizer to the other energizing coil or set of coils. The impressed electro-motive force in the secondary circuit in this case will be dependent upon the current in the primary circuit and this latter will be kept from rising by the increased self-induction when the armature load is lessened. Transformers or converters, however, as ordinarily constructed, are not well adapted for this purpose, for reasons which are hereinafter explained, and our invention consists in a converter of special construction as an element of the invention or combination above described.

In converters as ordinarily constructed and worked the ampère turns in the primary and secondary coils are nearly equal, the number in the secondary being, if anything, rather less. In consequence of this it is usual to put into the two coils the same weight of copper.

We have found that, when a converter is used in conjunction with a polarizer or condenser to produce two currents differing in phase by ninety degrees, this proportion between the ampère turns is objectionable, for, when the current in the secondary of the transformer is ninety degrees behind the primary current, it is just in phase with the electro-motive force impressed by the primary current, and its total reaction on the primary circuit is in the nature of creating in the latter a resistance or a counter electro-motive force directly in opposition to the primary current. The magnitude of the electro-motive force thus set up is a measure of the work done in the secondary circuit while the reaction produces no effect on the self-induction of the primary. Now when the number of ampère turns is the same in both coils, the counter electro-motive force due to the reaction of the secondary circuit will be equal to the electro-motive force of self-induction in the primary, and these two electro-motive forces will be at right angles, since one is in opposition to the primary current and the other at right angles to it. The current, therefore, neglecting the resistance of the primary coil, which is small in comparison with the secondary reaction, will be caused to lag forty-five degrees, since the impressed electro-motive force at the terminals of the primary circuit must be equal the vector sum of the two counter electro-motive forces and these latter as shown are equal in magnitude and at right angles. The effective energy delivered will be equal to the impressed electro motive force multiplied by the current and this by the cosine of the angle of lag which in the case under consideration would be about seven-tenths of the apparent energy. But if the number of ampère turns in the secondary be increased, say to twice the number in the primary, much better conditions will be secured, for with the ampère turns of the secondary twice those of the primary, the secondary reaction on the primary will, in magnitude, be twice the electro-motive force of self-induction in the primary—although in the same direction as before. By this means the lag of the current in the primary behind the impressed electro-motive force would be materially reduced and the effective energy, would, become equal to about nine-tenths of the apparent energy, so, with a still higher ratio of ampère turns in the secondary the results would be still better. The greater number of ampère turns in the secondary does not necessarily require a greater mass of copper in that coil, but if only the same mass be employed the loss of energy due to the heating of the secondary coil will become considerable and the efficiency of the transformer will be lowered. We therefore prefer in practice to employ a greater mass of copper in the secondary circuit than in the primary, say, in proportion to the number of ampère turns in the secondary.

The invention, as far as it may be illustrated diagrammatically is shown in the accompanying drawing, in which—

A, A, represent the conductors of an alternating circuit; B the armature and M, N, the two energizing or field coils of any ordinary two-phase motor.

The primary coil P, of a transformer or converter, of which C represents the core, and one of the motor coils, as M, are included in series in the main circuit. The circuit of the secondary coil S includes the other energizing coil N and a condenser or polarization cell D adjusted to the requirements of the system so as to produce between the currents in the two motor circuits an approximate difference of ninety degrees. The use of a condenser in this connection is now well understood, and in view of the present public information on the subject it need only be said of the polarization cell that it consists of conducting plates or couples in an electrolyte by which the plates are not chemically attacked, and included in the circuit in the usual way.

Having now described our invention, what we claim is—

1. The combination with an alternating current two-phase motor having independent energizing circuits, a main circuit from a source of alternating currents, a transformer the primary and secondary coils of which are in circuit with the motor coils respectively, and a condenser in series with the secondary coil and one of the motor coils, the transformer being constructed or designed with a greater number of ampère turns in the secondary than in the primary circuit.

2. The combination with an alternating current two-phase motor having independent energizing circuits, a main circuit from a source of alternating currents, a transformer the primary and secondary coils of which are in circuit with the motor coils respectively, and a condenser in series with the secondary coil and one of the motor coils, the transformer being constructed or designed with a greater number of ampère turns in the secondary than in the primary and having a mass of copper in the secondary greater than that in the primary in proportion to the number of ampère turns.

WILLIAM STANLEY, JR.
JOHN F. KELLY.

Witnesses:
C. C. CHESNEY,
H. A. VOLIN.